(12) United States Patent
Bae et al.

(10) Patent No.: US 8,076,045 B2
(45) Date of Patent: Dec. 13, 2011

(54) SOLID OXIDE FUEL CELL

(75) Inventors: Joongmyeon Bae, Daejeon (KR); Seung-Wook Baek, Gyeongsangnam-do (KR)

(73) Assignee: Korea Advanced Institute of Science and Technology, Daejeon (KR)

(*) Notice: Subject to any disclaimer, the term of this patent is extended or adjusted under 35 U.S.C. 154(b) by 148 days.

(21) Appl. No.: 11/943,492

(22) Filed: Nov. 20, 2007

(65) Prior Publication Data
US 2009/0035636 A1 Feb. 5, 2009

(30) Foreign Application Priority Data
Jul. 30, 2007 (KR) .................. 10-2007-0076377

(51) Int. Cl.
$H01M\ 4/02$ (2006.01)
$H01M\ 8/10$ (2006.01)
$H01M\ 4/48$ (2010.01)

(52) U.S. Cl. ........ 429/534; 429/481; 429/486; 429/488; 429/533

(58) Field of Classification Search .............. 429/12–46, 429/400–535
See application file for complete search history.

(56) References Cited

U.S. PATENT DOCUMENTS

| 2004/0121222 A1* | 6/2004 | Sarkar et al. ............ 429/45 |
| 2009/0023030 A1* | 1/2009 | Bae et al. ............ 429/30 |
| 2009/0035637 A1* | 2/2009 | Bae et al. ............ 429/30 |

FOREIGN PATENT DOCUMENTS

| JP | 2002222659 | 8/2002 |
| JP | 2002334706 | 11/2002 |
| JP | 2003168448 | 6/2003 |
| JP | 2005056816 | 3/2005 |
| JP | 2006236674 | 9/2006 |

OTHER PUBLICATIONS

James Larminie et al., "Fuel Cell Systems Explained", Second Edition, John Wiley & Sons Ltd., England; 2003.

* cited by examiner

*Primary Examiner* — Basia Ridley
*Assistant Examiner* — Jonathan G Leong
(74) *Attorney, Agent, or Firm* — The Webb Law Firm

(57) ABSTRACT

The present invention relates to a solid oxide fuel cell in which an anode is formed with a hollow portion, and the hollow portion may be used as a gas diffusion path, thereby improving gas diffusion performance, and the hollow portion may be also used as a reinforcement hole for reinforcing a strength or a current collecting hole for increasing a current collecting efficiency, thereby improving a cell strength and also increasing an efficiency of producing electric energy. The solid oxide fuel cell has an electrolyte layer; an anode; a cathode; and a hollow portion formed in the anode.

5 Claims, 7 Drawing Sheets

(a)

(b)

SOLID OXIDE FUEL CELL

TECHNICAL FIELD

The present invention relates to a solid oxide fuel cell (SOFC), and more particularly, to a solid oxide fuel cell in which an anode is formed with a hollow portion, and the hollow portion may be used as a gas diffusion path, thereby improving gas diffusion performance, and the hollow portion may be also used as a reinforcement hole for reinforcing a strength or a current collecting hole for increasing a current collecting efficiency, thereby improving a cell strength and also increasing an efficiency of producing electric energy.

BACKGROUND ART

A fuel cell, which directly converts chemical energy generated by oxidation into electrical energy, is a new green futuristic energy technology which can generates the electrical energy from materials such as oxygen, hydrogen and the like which is found in abundance on the earth.

In the fuel cell, oxygen is supplied to a cathode and hydrogen is supplied to an anode so that an electrochemical reaction is performed in a reverse way of water electrolysis so as to generate electricity, head and water, thereby producing the electrical energy without any contamination.

Since the fuel cell is free from limitation of Carnot cycle efficiency which acts as the limitation in a conventional heat engine, it is possible to increase an efficiency of 40% or more. Further, since only the water is exhausted as emissions, there is not a risk of environmental pollution. Furthermore, since there is not a necessity of a place for mechanical motion, unlike in the conventional heat engine, it has some advantages of reducing a size and a noise. Therefore, the fuel cell technologies (e.g. material, fabrication, etc) are actively investigated at many famous laboratories all over the world at present.

According to a kind of electrolyte used therein, the fuel cell is classified into a PAFC (Phosphoric Acid Fuel Cell), a MCFC (Molten Carbonate Fuel Cell), a SOFC (Solid Oxide Fuel Cell), a PEMFC (Polymer Electrolyte Membrane Fuel Cell), a DMFC (Direct Methanol Fuel Cell) and an AFC (Alkaline Fuel Cell) which are already being used or developed. Characteristics thereof will be described in a table.

|  | PAFC | MCFC | SOFC | PEMFC | DMFC | AFC |
| --- | --- | --- | --- | --- | --- | --- |
| Electrolyte | Phosphoric acid | Lithium carbonate/ Potassium carbonate | Zirconia/ Ceria series | Hydrogen ion exchange membrane | Hydrogen ion exchange membrane | Potassium hydroxide |
| Ion conductor | Hydrogen ion | Carbonic acid ion | Oxygen ion | Hydrogen ion | Hydrogen ion | Hydrogen ion |
| Operation temperature | 200 | 650 | 500~1000 | <100 | <100 | <100 |
| Fuel | Hydrogen | Hydrogen, carbon monoxide | Hydrogen, hydrocarbon, carbon monoxide | Hydrogen | methanol | Hydrogen |
| Raw material of fuel | City gas, LPG | City gas, LPG, coal | City gas, LPG, Hydrogen | Methanol, Methane gasoline, Hydrogen | methanol | Hydrogen |
| Efficiency (%) | 40 | 45 | 45 | 45 | 30 | 40 |
| Range of output power (W) | 100-5000 | 1000-1000000 | 100-100000 | 1-10000 | 1-100 | 1-100 |
| Application | Distributed power generation | Large scale power generation | Small, middle and large scale power generation | Power source for transport | Portable power source | Power source for space ship |
| Development level | Demonstrated- utilized | Tested- demonstrated | Tested- demonstrated | Tested- demonstrated | Tested- demonstrated | Applied to space ship |

As described in the table, the fuel cells have various ranges of output power and applications and the like. Thus, a user can selectively use one of the fuel cells for various purposes. Particularly, the SOFC has a disadvantage that its operation temperature is high, but also has an advantage that it can be used for large scale power generation.

FIG. 1 is a view showing an operation principle of the SOFC, wherein oxygen is supplied to the cathode and hydrogen is supplied to the fuel electrode. At this time, the reaction is performed as follows:

Reaction in the anode:

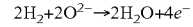

$$2H_2 + 2O^{2-} \rightarrow 2H_2O + 4e^-$$

Reaction in the cathode:

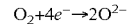

$$O_2 + 4e^- \rightarrow 2O^{2-}$$

In the SOFC having the characteristic described above, the higher the diffusion performance of the hydrogen supplied to the anode is, the more an efficiency of the fuel cell is increased. Therefore, in order to increase the diffusion performance of the hydrogen supplied to the fuel electrode, a gas diffusion layer is formed by artificially adding an additive like polymer or carbon.

In the conventional SOFC, since pores are formed by adding the additive to the gas diffusion layer, strength of the SOFC is reduced. But if a thickness of the anode is increased in order to solve the problem, gas diffusion is deteriorated, and thus a performance of the fuel cell is also deteriorated. Particularly, the performance of the fuel cell is damaged in a high current range.

Further, according as the reaction is processed, a gas diffusion path is clogged by carbon deposition. Thus, fuel supplying to a catalytic layer contacted with an electrolyte layer is blocked. Since it makes difficult to collect current generated from the fuel electrode, there is a problem of electric power loss.

DISCLOSURE OF THE INVENTION

It is an object of the present invention to provide a solid oxide fuel cell in which fuel gas can be supplied to the electrolyte layer so as to increase a fuel gas diffusion performance and also reduce a diffusion resistance, thereby obtaining a low partial pressure of fuel and a high performance even in the high current range.

It is another object of the present invention to provide a solid oxide fuel cell which can minimize a resistance due to current collection, thereby reducing the unnecessary electric power loss.

To achieve the object, there is provided a solid oxide fuel cell comprising an electrolyte layer 10; an anode 20; a cathode 30; and a hollow portion formed in the anode 20.

Preferably, the hollow portion is used as a gas diffusion path 23.

Preferably, the hollow portion is used as a reinforcement hole 25, and a reinforcement member 26 is inserted into the reinforcement hole 25.

Preferably, the hollow portion is used a current collecting hole 27, and a current collecting member 28 is inserted into the current collecting hole 27.

Preferably, a current collecting layer 29 connected with the current collecting member 28 is further provided at an outer surface of the anode 20.

Preferably, the anode 20 is further formed with an expanded portion 24 which is expanded at a predetermined area of the gas diffusion path 23.

Preferably, the hollow portion is longitudinally or laterally formed in the anode 20.

Preferably, the hollow portions are connected with each other so as to form a continuous path.

DETAILED DESCRIPTION OF MAIN ELEMENTS

| 100: solid oxide fuel cell (SOFC) | |
|---|---|
| 10: electrolyte layer | 20: fuel electrode |
| 21: first layer | 22: second layer |
| 23: gas diffusion path | 24: expanded portion |
| 25: reinforcement hole | 26: reinforcement member |
| 27: current collecting hole | |
| 28: current collecting member | |
| 29: current collecting layer | |
| 30: air electrode | |

BEST MODE FOR CARRYING OUT THE INVENTION

Practical and presently preferred embodiments of the present invention are illustrative with reference to the accompanied drawings.

Figure 1:
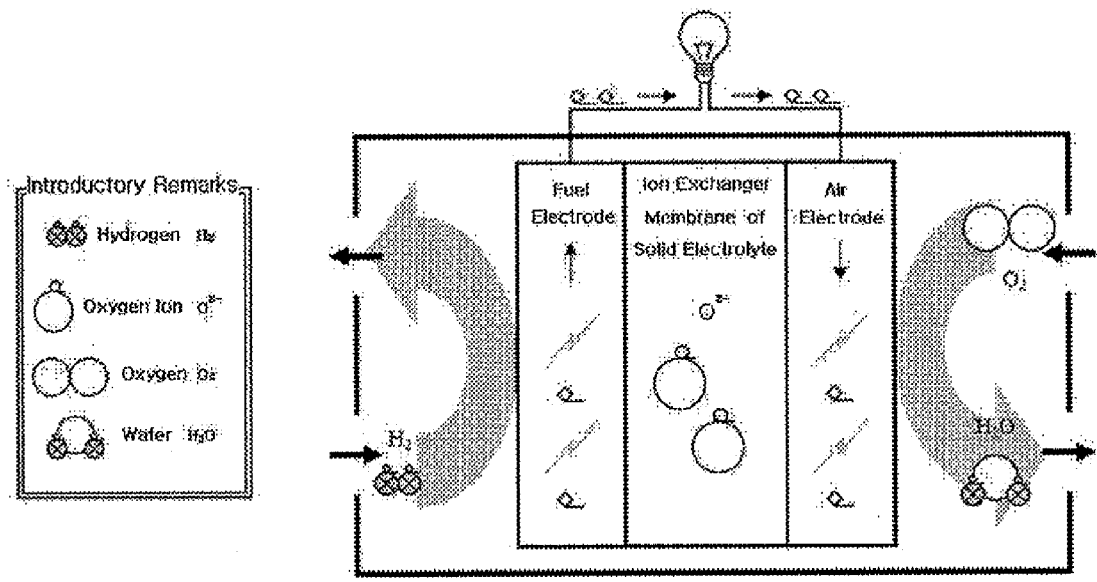
FIG. 1 is a schematic diagram showing an operation principle of a solid oxide fuel cell (SOFC).
Figure 2:
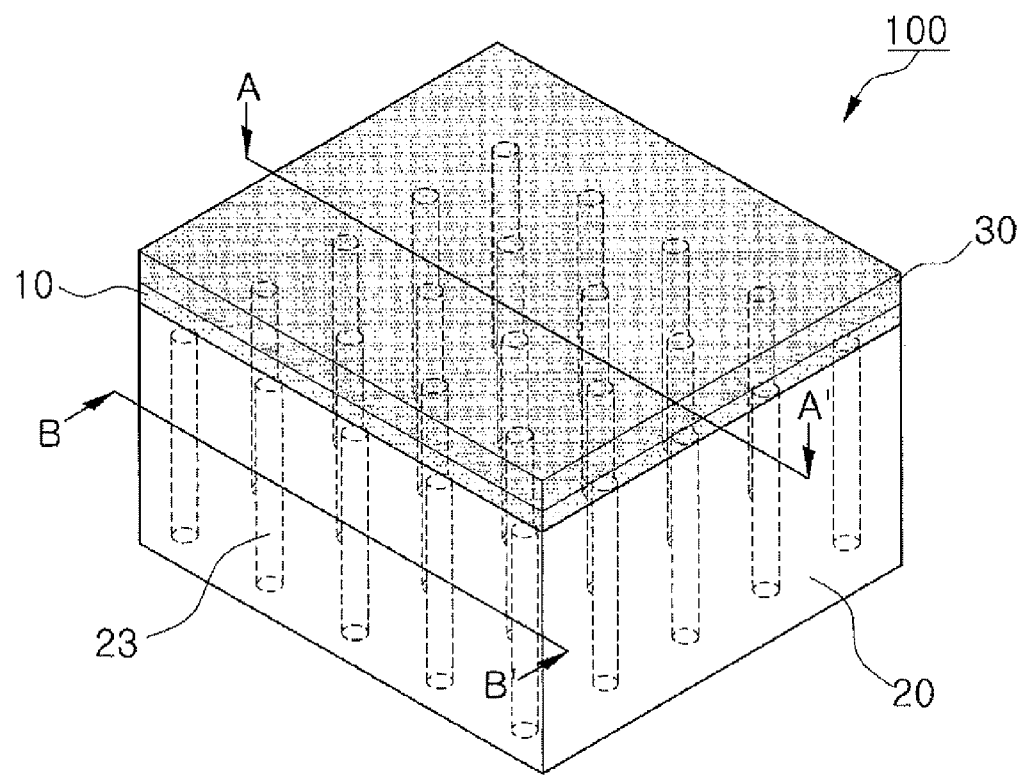
FIG. 2 is a perspective view of a SOFC according to the present invention.
Figure 3:
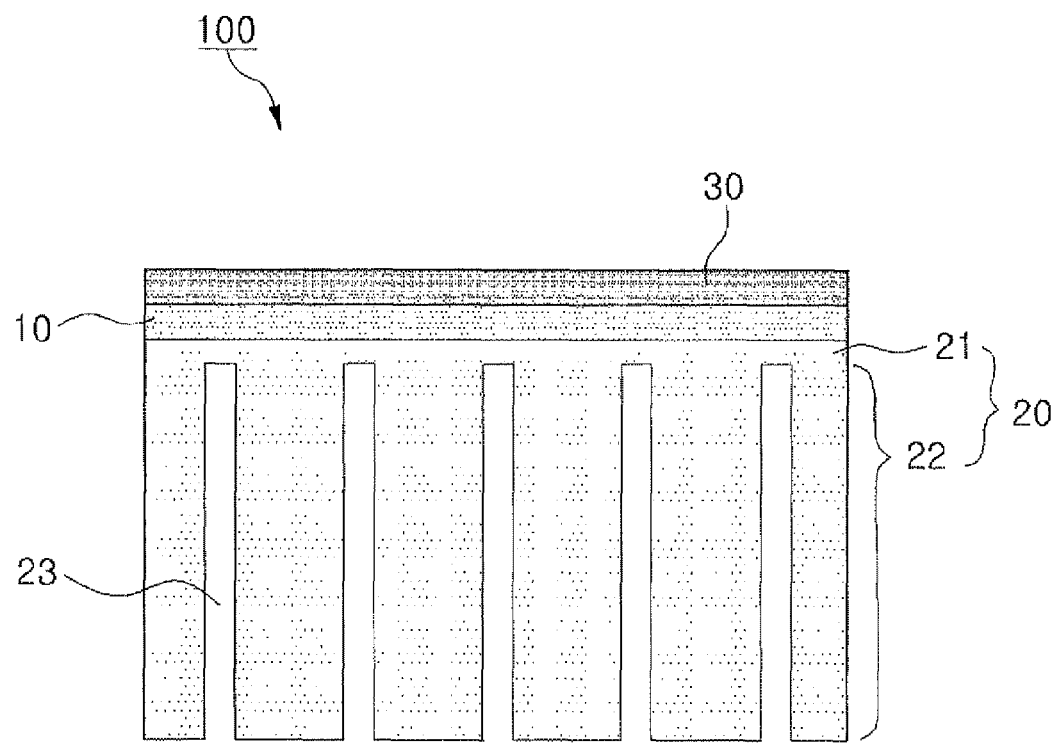
FIG. 3 is a cross-sectional view taken along a line A-A' of FIG. 2.
Figure 4:
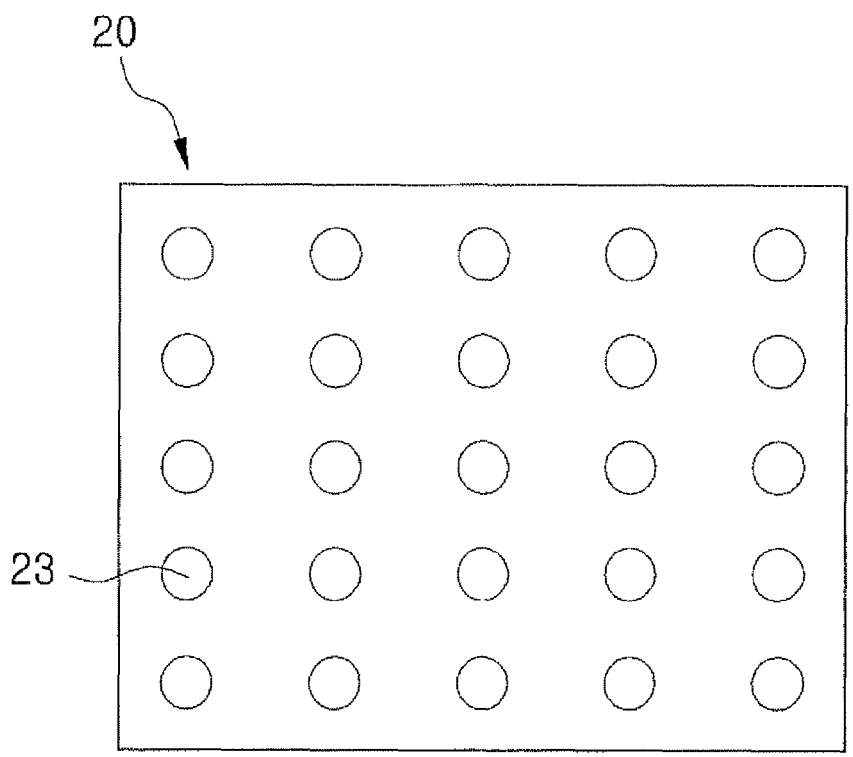
FIG. 4 is a cross-sectional view taken along a line B-B' of FIG. 2.

FIG. 2 is a perspective view of a SOFC 100 according to the present invention, FIG. 3 is a cross-sectional taken along a line A-A' of FIG. 2, and FIG. 4 is a cross-sectional taken along a line B-B' of FIG. 2.

As shown in FIGS. 2 to 4, the SOFC 100 includes an electrolyte layer 10, an anode 20 and a cathode 30, and the anode 20 is formed with a hollow portion.

The anode 20 and the cathode 30 are formed to be contacted with both surfaces of the electrolyte layer 10. Since an efficiency of the fuel cell is influenced by facility of supplying fuel gas to the electrolyte layer 10, the hollow portion is used as a gas diffusion path 23 so as to reduce a partial pressure difference and diffusion resistance of the fuel gas, thereby improving a performance of the fuel cell. Thus, it is possible to produce a large quantity of electric power even in the low fuel partial pressure and the high current range. Further, by quickly inducing oxidation-reduction reactions in the anode 20, it is also possible to quickly stabilize the cell and the performance thereof.

Particularly, according to the SOFC 100 of the present invention, when it is used as a large sized cell, it is possible to obtain a maximum effect thereof.

As shown in FIGS. 3 and 4, the gas diffusion path 23 is longitudinally provided in plural so as to increase a surface area thereof. The fuel gas is moved through each of the gas diffusion paths 23, and thus a moving distance of the fuel gas is reduced, so that the fuel gas can be rapidly diffused.

Figure 5:
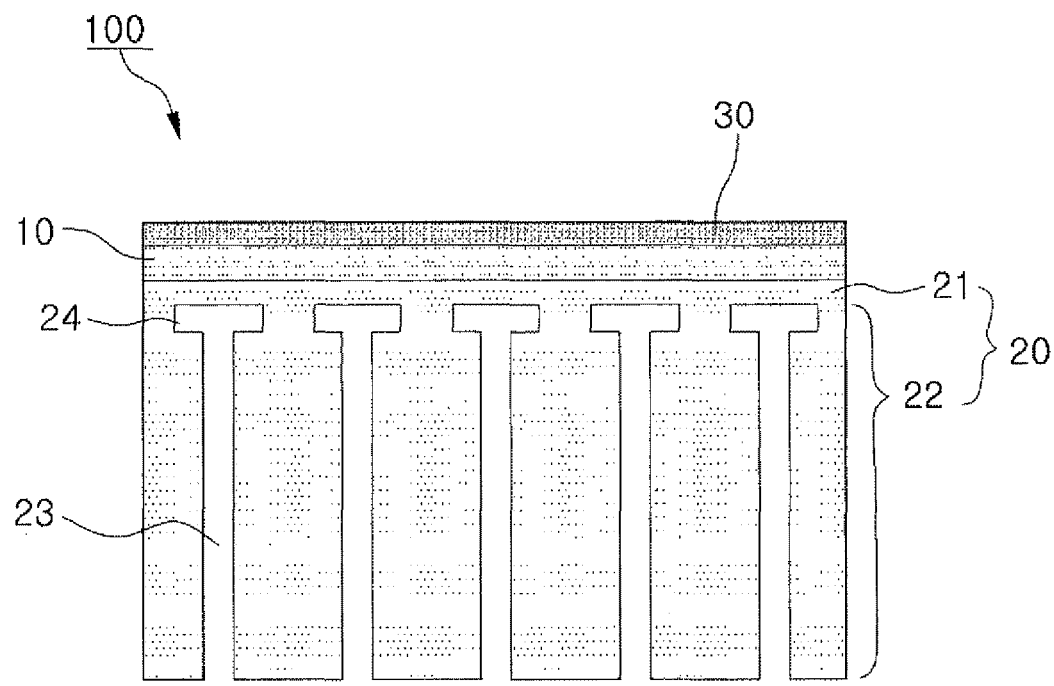
FIG. 5 is a view of a SOFC according to an embodiment of the present invention.
Figure 5:
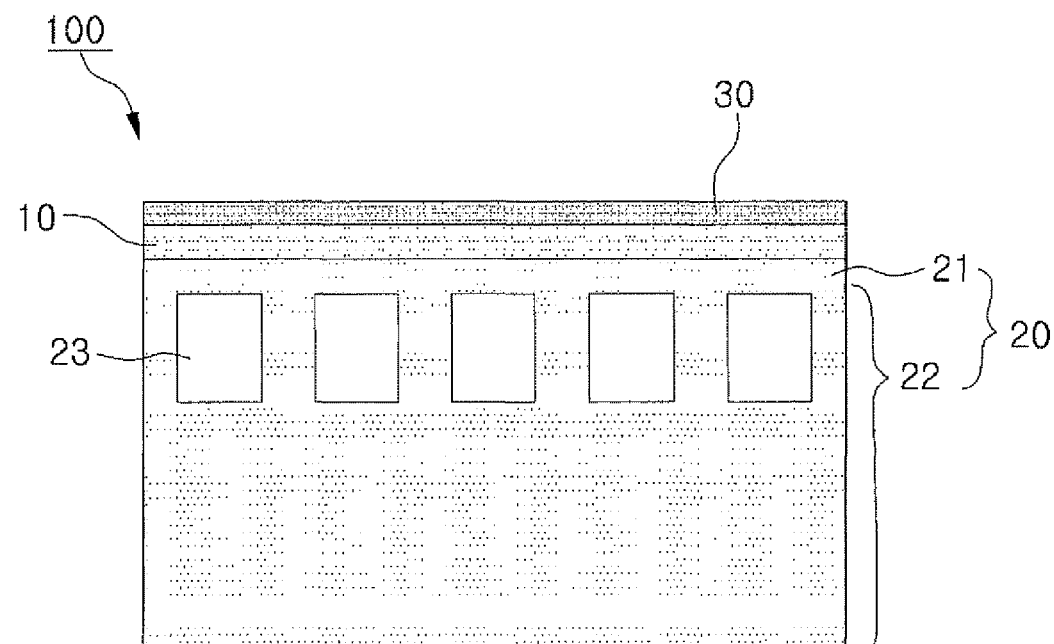

FIG. 5 is a view of a SOFC according to an embodiment of the present invention, wherein FIG. 5(*a*) shows an example in which an inner end of the gas diffusion path 23 is expanded in the anode 20 so as to secure a surface area contacted with the catalyst electrode, and FIG. 5 (*b*) shows an example in which the gas diffusion path is formed laterally.

The anode 20 may be comprised of a first layer 21 which is adjacent to the electrolyte layer 10 and in which the hollow portion is not formed, and a second layer 22 in which the hollow portion is formed. Preferably, the first layer 21, which is adjacent to the electrolyte layer 10, has not the hollow portion so that a reaction due to a three-phase boundary is occurred directly and rapidly, and the second layer 22 has the hollow portion so that the fuel gas can be supplied smoothly.

Furthermore, the expanded portion 24 means a portion that a predetermined area in the anode 20 is expanded. 5 (a) shows the example in which the inner end of the gas diffusion path 23 is expanded. However, the SOFC 100 of the present invention may have various modified embodiments.

Figure 6:
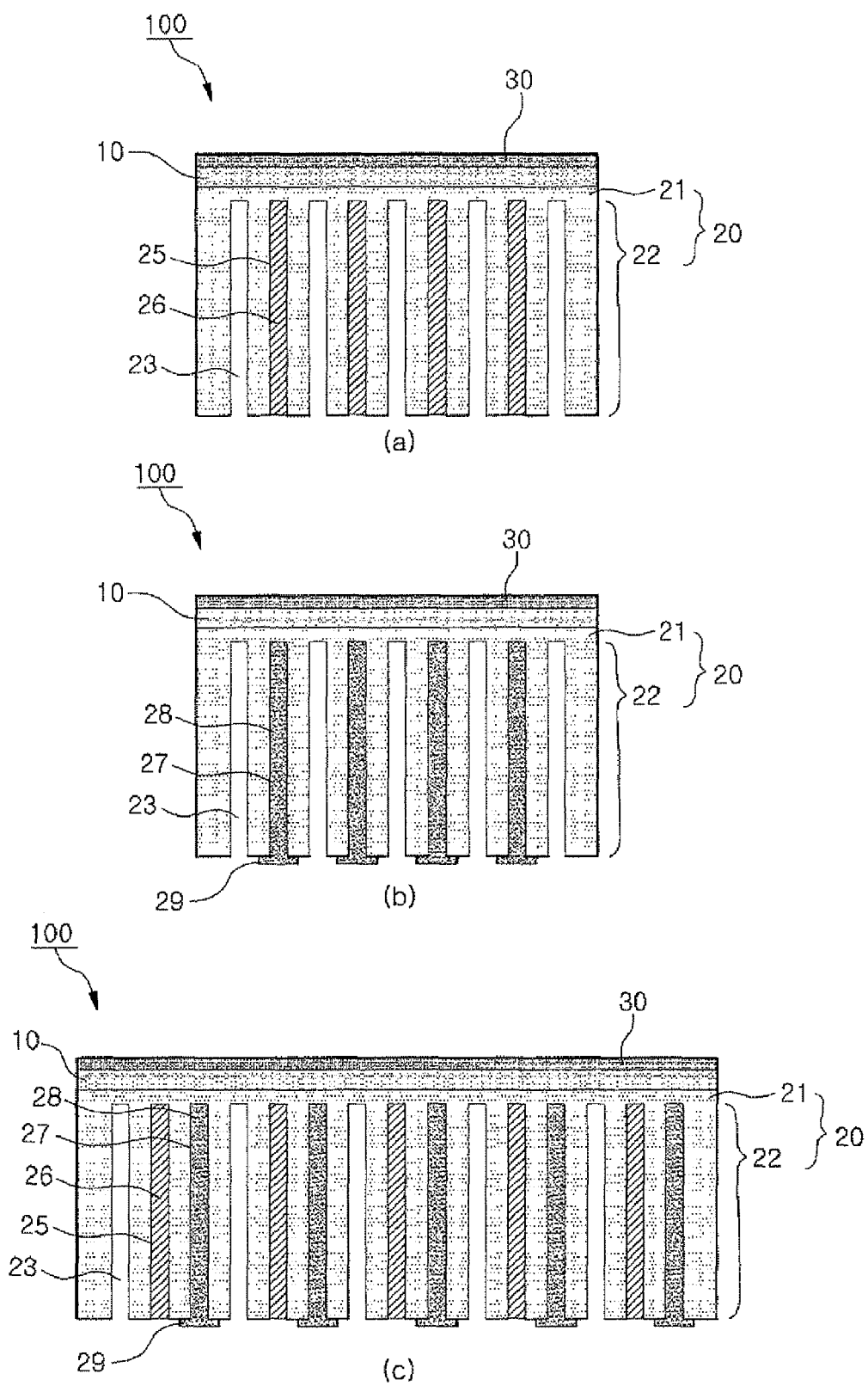
FIG. 6 is a view of a SOFC according to another embodiment of the present invention.

FIG. 6 is a view of a SOFC according to another embodiment of the present invention. FIG. 6 (a) shows an example in which a part of the hollow portions formed in the anode 20 function as the gas diffusion paths 23, and the rest function as reinforcement holes 25, and a reinforcement member 25 is inserted into each of the reinforcement holes 25.

The reinforcement hole 25 is to prevent the strength of the anode 20 from being weakened by the formation of the gas diffusion paths 23. The reinforcement hole 25 may have various shapes according to a size of the SOFC 100 and the number of the gas diffusion paths 23 and a size of each of the gas diffusion paths 23.

FIG. 6 (b) shows an example in which a part of the hollow portions function as the gas diffusion paths 23, and the rest function as current collecting holes 27, and a current collecting member 28 is inserted into each of the current collecting holes 27 so as to increase a current collecting efficiency of generated electric energy.

Typically, the current collecting in the fuel cell is performed by putting a current collector to a lower side of the cell. However, during the current collecting process, an electric power loss is occurred and it leads to the deterioration of the performance of the fuel cell.

Therefore, in the SOFC 100 of the present invention, the anode 20 is formed with the current collecting hole 27, and the current collecting member 28 is inserted into the current collecting hole 27 so as to directly collect the current in the cell, thereby increasing the current collecting efficiency.

In addition, a current collecting layer 29 extended from the current collecting member 28 may be further provided at an outer surface of the anode 20 so that electrons can be facilely moved to the outside of the cell through the current collecting member 28 and the current collecting layer 29, thereby further increasing the current collecting efficiency.

The current collecting layer 29 can be formed by screen printing, sputtering, metal spraying and the like.

FIG. 6 (c) shows an example in which the hollow portions function as the gas diffusion paths 23, the reinforcement holes 25 and the current collecting holes 27, and the reinforcement members 26 and the current collecting members 28 are respectively inserted into the reinforcement holes 25 and the current collecting holes 27.

As shown in FIG. 6 (c), the anode 20 is formed with the gas diffusion paths 23, the reinforcement holes 25 and the current collecting holes 27, and the reinforcement members 26 are inserted into the reinforcement holes 25, and the current collecting members 28 are inserted into the current collecting holes 27. Accordingly, it is possible to prevent the strength of the anode 20 from being weakened by the formation of the spaces, and it is also possible to increase the fuel gas diffusing performance and the current collecting performance, thereby further improving the efficiency of the cell.

The reinforcement member 26 may be formed of a single metal like Ni, or a Cermet in which metal and ceramic are mixed. In other words, the reinforcement member 26 may be formed of Ni, Ce-based oxide, YSZ-based oxide or a mixture of the Ni, Ce-based oxide and YSZ-based oxide. At this time, it is preferable that the ceramic is the same as that forming the anode 20. A predetermined strength of the anode 20 can be obtained by controlling a content of NiO.

The current collecting members 28 may be also formed of Ni, a single metal like a catalytic metal of the fuel electrode, or the Cermet in which metal and ceramic are mixed. Preferably, the ceramic is the same as that forming the anode 20 so as to reduce thermal deformation and also to prevent a reaction between the reinforcement member 26 and the anode 20.

The reinforcement member 26 and the current collecting member 28 may be variously formed by the above methods of forming the anode 20. That is, the anode 20 is formed with the gas diffusion paths 23, the reinforcement holes 25 and the current collecting holes 27, and bar-type reinforcement members 26 and current collecting members 28 may be respectively inserted into the reinforcement holes 25 and the current collecting holes 27.

Figure 7A:
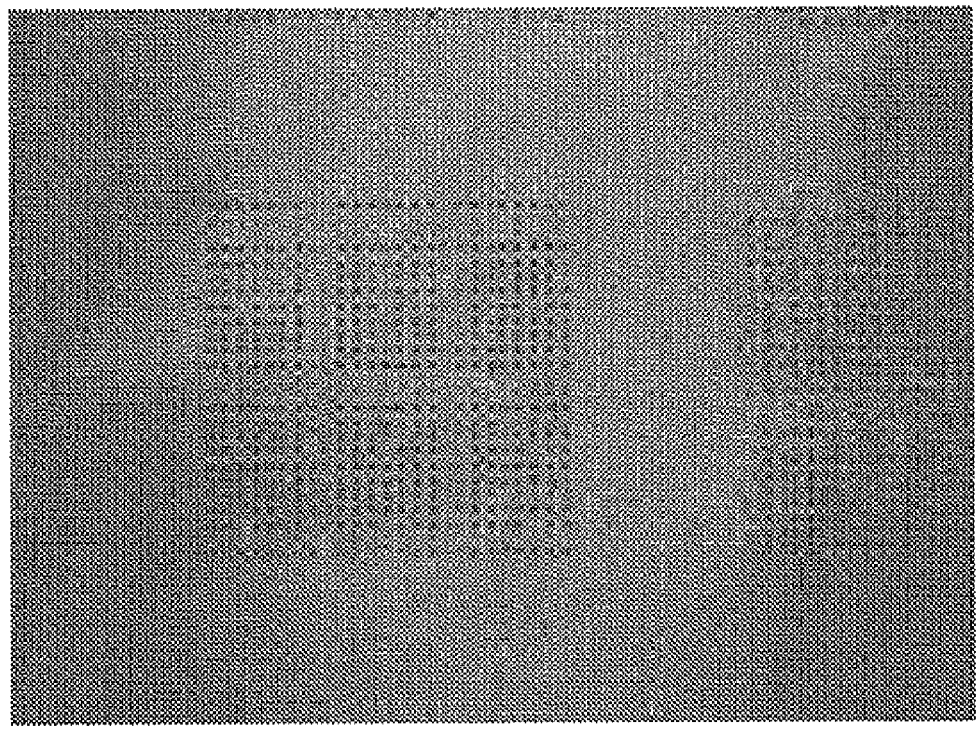
FIG. 7a is a photograph showing a sheet for forming the SOFC according to the present invention.

FIG. 7a is a photograph showing a sheet for forming the SOFC according to the present invention. The SOFC 100 of the present invention may be formed by stacking one or multiple sheets in which the hollow portions are formed.

Figure 7B:
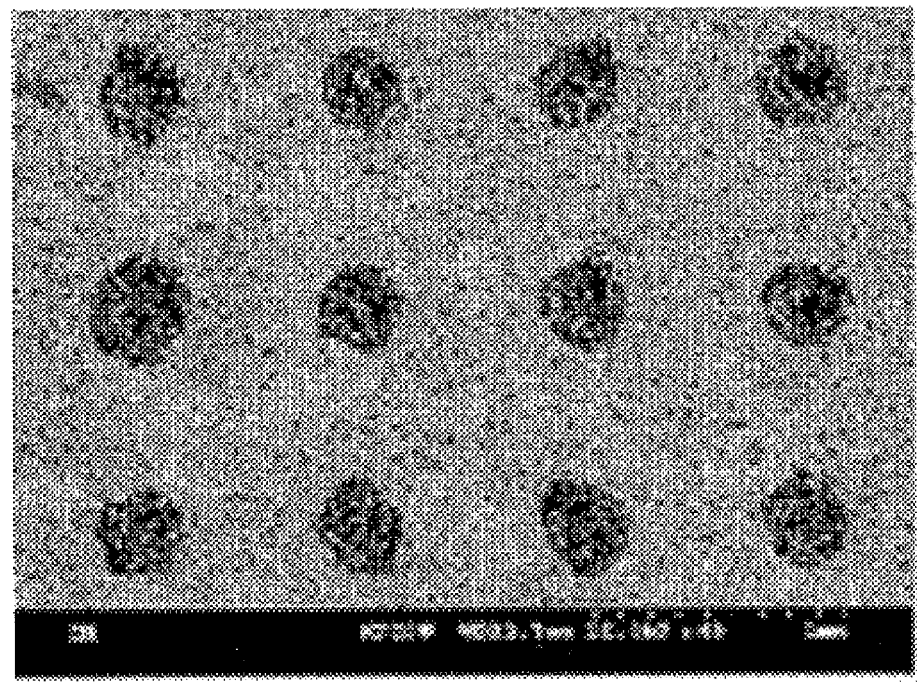
FIG. 7b is another SEM (Scanning Electron Microscope) photograph showing the sheet for forming the SOFC according to the present invention.

Further, FIG. 7b is another SEM (Scanning Electron Microscope) photograph showing the sheet for forming the SOFC according to the present invention. In case that the anode 20 is formed by the sheet stacking method, the SOFC 100 of the present invention may be formed by filling the reinforcement member 26 or the current collecting member 28 into each hollow portion before the stacking of the sheets and then stacking the sheets and performing a heat treatment.

Furthermore, in the above case that the anode 20 is formed by the sheet stacking method, holes are formed in each of the sheets, and the reinforcement member 26 or the current collecting member 28 is filled into each of the holes before the stacking of sheets, and then the stacking and heat-treating processes are performed.

And, in case that the holes are used as the gas diffusion paths, the filling process may be omitted.

Figure 8:
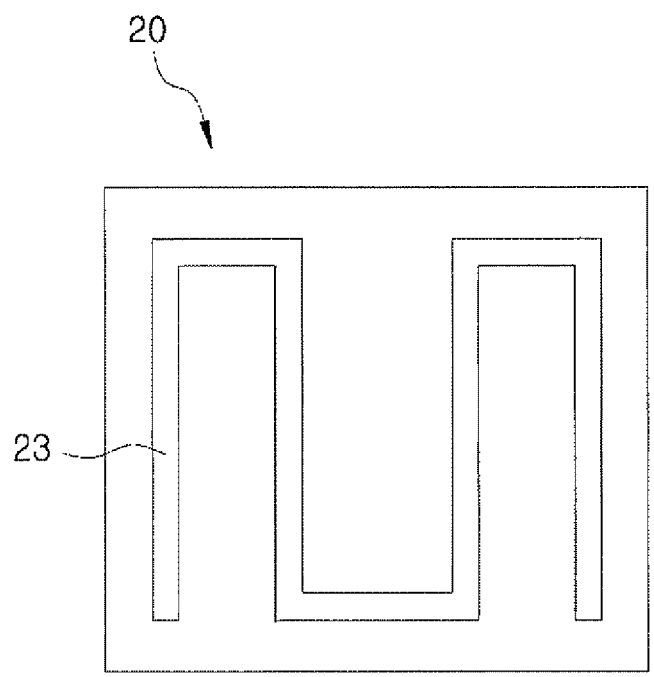
FIG. 8 is a view of a SOFC according to yet another embodiment of the present invention.
Figure 9:
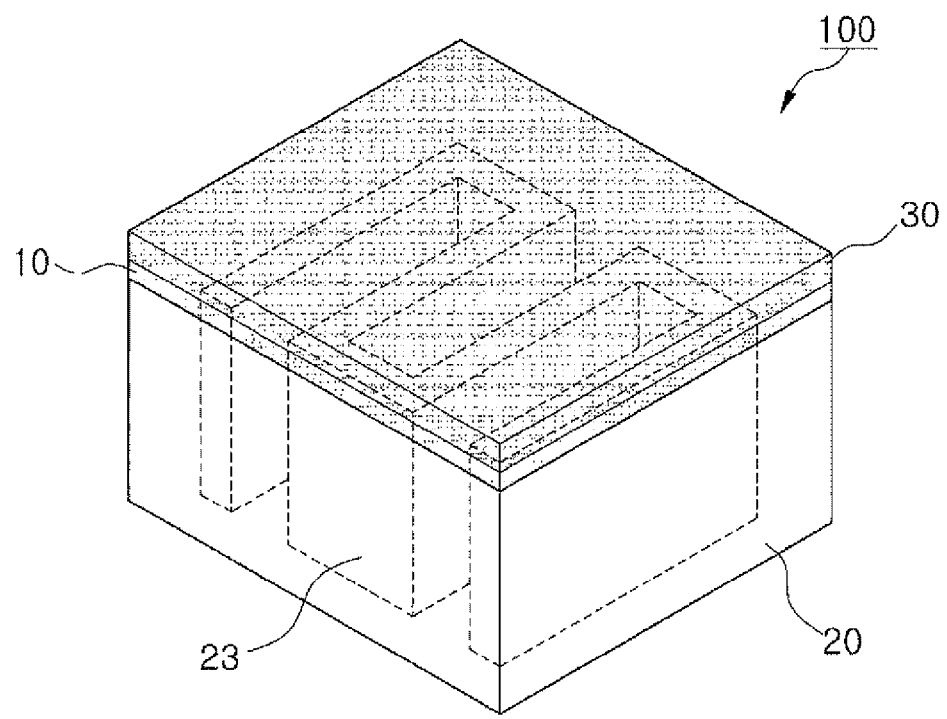
FIG. 9 is a perspective view of the SOFC of FIG. 8.

FIG. 8 is a view of a SOFC according to yet another embodiment of the present invention, and FIG. 9 is a perspective view of the SOFC of FIG. 8. Herein, the gas diffusion paths 23 are connected with each other so as to form a continuous channel type path.

Even in the case that the gas diffusion path 23 is formed as the continuous channel type path, the reinforcement member 26 and the current collecting member 28 may be further provided as described above.

Figure 10:
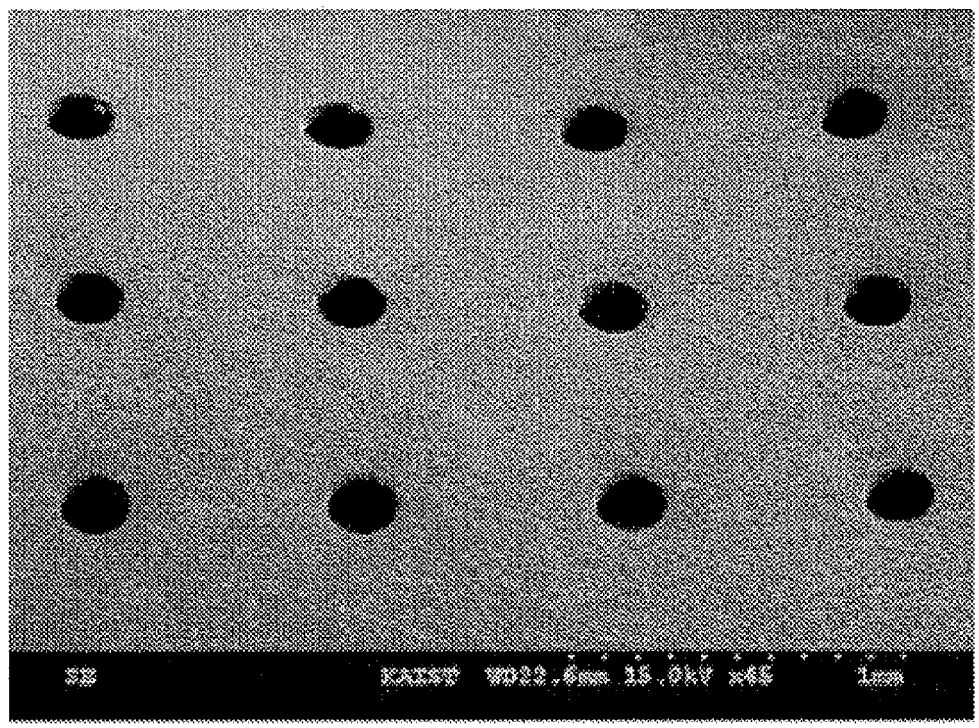
FIG. 10 is a photograph of an anode of the SOFC according to the present invention (before sintering).
Figure 11:
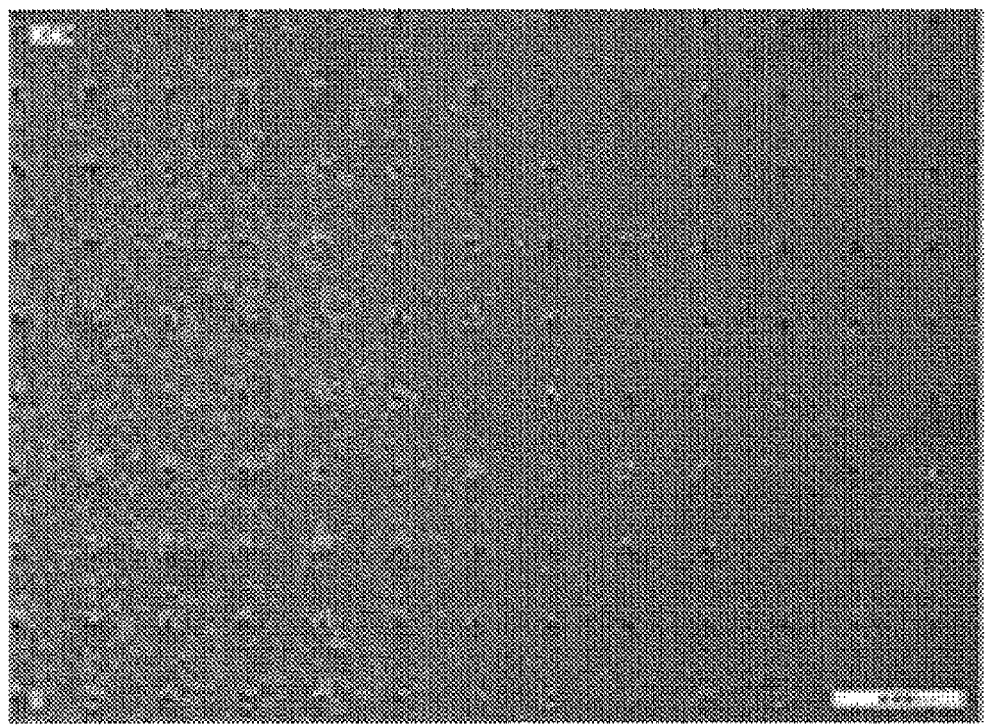
FIG. 11 is another photograph of the anode of the SOFC according to the present invention (after sintering).

FIGS. 10 and 11 shows the anode of the SOFC according to the present invention, wherein FIG. 10 is a photograph of the fuel electrode, in which the hollow portions are formed, before sintering, and FIG. 11 is another photograph of the fuel electrode, in which the hollow portions are formed, after sintering.

The hollow portion of the SOFC 100 according to the present invention may be formed into a spiral shape, an oblique shape, an orthogonal shape, a net shape or other various shapes.

INDUSTRIAL APPLICABILITY

According to the SOFC of the present invention, there is provided the hollow portion which may be used as the effective gas diffusion path so as to move the fuel gas to the electrolyte layer without an increase of the gas partial pressure difference, thereby facilely performing the reaction. Further, it is possible to improve the diffusion performance of the fuel gas and also to reduce a loss due to the diffusion resistance, thereby improving a performance of the fuel cell. Thus, it is possible to produce a large quantity of electric power even in the low fuel partial pressure and the high current range. Furthermore, it is also possible to quickly stabilize the cell and the performance thereof by quickly inducing oxidation-reduction reactions in the fuel electrode.

In addition, according to the SOFC of the present invention, the hollow portion may be also used as the reinforcement hole and the reinforcement member is inserted therein, thereby obtaining a mechanical strength for supporting the SOFC. And the hollow portion may be also used as the current collecting hole, and the current collecting member is inserted therein so as to form the current collecting layer, thereby reducing a loss of electrons, rapidly collecting the current and thus increasing an efficiency of producing electric energy.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A solid oxide fuel cell, comprising:
   an electrolyte layer;
   an anode and a cathode respectively formed to be contacted with both sides of the electrolyte layer; and
   a plurality of current collecting members each comprising a current collecting layer provided on an outer surface of the anode only
   wherein hollow portions are formed in the anode;
   wherein a first group of the hollow portions form gas diffusion paths;
   wherein a second group of the hollow portions form reinforcement holes, and reinforcement members are respectively inserted into the reinforcement holes; and
   wherein a third group of the hollow portions form current collecting holes, and the current collecting members are respectively inserted into the current collecting holes.

2. The solid oxide fuel cell as set forth in claim 1, wherein the anode is further formed with an expanded portion which is expanded at a predetermined area of the gas diffusion path.

3. The solid oxide fuel cell as set forth in claim 1, wherein the hollow portions are longitudinally formed in the anode.

4. The solid oxide fuel cell as set forth in claim 1, wherein the hollow portions are laterally formed in the anode.

5. The solid oxide fuel cell as set forth in claim 4, wherein the hollow portions are connected to each other to form a continuous path.

* * * * *